(12) United States Patent
Perley et al.

(10) Patent No.: US 11,598,311 B2
(45) Date of Patent: Mar. 7, 2023

(54) SYSTEM AND METHOD FOR CONTROLLING A WIND TURBINE IN RESPONSE TO A BLADE LIBERATION EVENT

(71) Applicant: General Electric Company, Schenectady, NY (US)

(72) Inventors: Thomas Franklin Perley, Livonia, MI (US); Jingting Xiao, Dallas, TX (US)

(73) Assignee: General Electric Company, Schenectady, NY (US)

( * ) Notice: Subject to any disclaimer, the term of this patent is extended or adjusted under 35 U.S.C. 154(b) by 171 days.

(21) Appl. No.: 16/862,702

(22) Filed: Apr. 30, 2020

(65) Prior Publication Data

US 2021/0340952 A1    Nov. 4, 2021

(51) Int. Cl.
| | | |
|---|---|---|
| *F03D 7/02* | (2006.01) | |
| *F03D 9/25* | (2016.01) | |
| *F03D 15/00* | (2016.01) | |
| *F03D 17/00* | (2016.01) | |

(Continued)

(52) U.S. Cl.
CPC ......... *F03D 7/0264* (2013.01); *F03D 7/0244* (2013.01); *F03D 7/0288* (2013.01); *F03D 7/042* (2013.01); *F03D 7/047* (2013.01); *F03D 9/25* (2016.05); *F03D 15/00* (2016.05); *F03D 17/00* (2016.05); *G01M 1/14* (2013.01); *F03D 7/0224* (2013.01); *F05B 2260/901* (2013.01); *F05B 2260/903* (2013.01); *F05B 2260/904* (2013.01); *F05B 2270/107* (2013.01)

(58) Field of Classification Search
None
See application file for complete search history.

(56) References Cited

U.S. PATENT DOCUMENTS

| | | | |
|---|---|---|---|
| 8,454,311 B2 * | 6/2013 | Hiremath | G01N 29/14 416/61 |
| 9,133,828 B2 | 9/2015 | Egedal et al. | |
| 9,523,354 B2 | 12/2016 | Olesen | |

(Continued)

FOREIGN PATENT DOCUMENTS

| | | |
|---|---|---|
| EP | 2458204 A1 | 5/2012 |
| EP | 3444576 A1 | 2/2019 |

(Continued)

OTHER PUBLICATIONS

European Search Report for EP Application No. 21170474.7, dated Sep. 16, 2021.

*Primary Examiner* — Juan G Flores
(74) *Attorney, Agent, or Firm* — Dority & Manning, P.A.

(57) ABSTRACT

A system and method are provided for controlling a wind turbine in response to a blade liberation event. Accordingly, estimated response signatures for the wind turbine are determined. Sensor data indicative of at least two actual response signatures of components of the wind turbine to a rotor loading are collected. The actual response signatures are compared to the estimated response signatures. The two or more actual response signatures meeting or exceeding the estimated response signatures is indicative of a blade liberation event. In response to detecting the blade liberation event, a rapid shutdown control logic is initiated to decelerate the rotor at a rate which exceeds a nominal deceleration rate of the rotor.

14 Claims, 8 Drawing Sheets

(51) Int. Cl.
   *F03D 7/04*      (2006.01)
   *G01M 1/14*      (2006.01)

(56) References Cited

U.S. PATENT DOCUMENTS

| | | | |
|---|---|---|---|
| 10,167,853 B2 | 1/2019 | Ide et al. | |
| 10,371,123 B2 | 8/2019 | Kammer | |
| 2012/0141275 A1* | 6/2012 | Hiremath | F03D 17/00 416/61 |
| 2015/0354402 A1* | 12/2015 | Ehsani | F03D 17/00 290/44 |

FOREIGN PATENT DOCUMENTS

| | | | |
|---|---|---|---|
| JP | | 6555729 B2 | 8/2019 |
| WO | WO 2015/014366 A1 | | 2/2015 |

\* cited by examiner

US 11,598,311 B2

SYSTEM AND METHOD FOR CONTROLLING A WIND TURBINE IN RESPONSE TO A BLADE LIBERATION EVENT

FIELD

The present disclosure relates in general to wind turbines, and more particularly to systems and methods for controlling wind turbines in the event of a blade liberation event.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

In certain instances, a portion of a rotor blade (or the rotor blade in its entirety) may separate from the wind turbine. Such blade liberation events may cause the rotor to become imbalanced, thereby causing damage or destruction to the wind turbine.

The damage resulting from an imbalanced rotor may increase with continued operation of the wind turbine after the development of the imbalanced condition. For existing wind turbines, the controller typically decelerates the rotor using components of the wind turbine operating within nominal design limits. However, in certain instances, such a deceleration rate may be inadequate to prevent or mitigate damage to the wind turbine. Accordingly, it may be desirable in certain instances to decelerate the rotor in an expedited manner following a blade liberation event. However, such rapid deceleration of the rotor can be costly. Therefore, it is important to eliminate the instance of false alarms (i.e. only decelerating the rotor when the blade liberation event has actually occurred).

Thus, the art is continuously seeking new and improved systems and methods that address the aforementioned issues. As such, the present disclosure is directed to systems and methods for controlling a wind turbine in response to a blade liberation event.

BRIEF DESCRIPTION

Aspects and advantages of the invention will be set forth in part in the following description, or may be obvious from the description, or may be learned through practice of the invention.

In one aspect, the present disclosure is directed to a method for controlling a wind turbine in response to a blade liberation event. The wind turbine may include a rotor with a rotatable hub and a plurality of rotor blades mounted thereto. The method may include determining a plurality of estimated response signatures for the wind turbine corresponding to a plurality of different blade liberation events. The method may also include collecting sensor data via a plurality of sensors during operation of the wind turbine. The sensor data may be indicative of a response of at least one component of the wind turbine to an actual rotor loading. The method may include identifying at least two actual response signatures within the sensor data. Additionally, the method may include determining whether the at least two actual response signatures equal or exceed two or more corresponding estimated response signatures of the plurality of estimated response signatures so as to determine the presence of a blade liberation event. In response to detecting the blade liberation event, the method may include initiating, with a controller, a rapid shutdown control logic to protect the wind turbine.

In an embodiment, the plurality of response signatures may include at least one of a load magnitude, a direction of the load being along a pitch axis, and acceleration vector of the at least one component, a first excitation frequency, a sensor communication loss, an acoustic signature corresponding to a blade liberation, a vibration signature corresponds to a blade liberation, a bending moment affecting a rotor shaft or a tower of the wind turbine, and/or a combination thereof.

In an additional embodiment, the acceleration vector of the at least one component may include a horizontal and a vertical displacement of the rotor in response to the load on the rotor.

In an embodiment, the acceleration vector of the at least one component may include an acceleration of a nacelle of the wind turbine in response to the wind loading. The nacelle acceleration may include an oscillation direction, an oscillation frequency, and an oscillation magnitude of the nacelle.

In a further embodiment, the acceleration vector of the at least one component may include a rotor speed response. The rotor speed response may be indicative of an acceleration or deceleration of the rotor in response to a rotor mass balance and rotational position.

In an embodiment, the method may also include determining a type of blade liberation event based on the at least two actual response signatures. The type of blade liberation event may include a departure of at least a portion of one of the plurality of rotor blades.

In an additional embodiment, the rapid shutdown control logic may include decelerating the rotor in a shortened time interval relative to a nominal shutdown control logic.

In a further embodiment, the rapid shutdown control logic may include overriding a nominal operational limit of at least one component of the wind turbine. The rapid shutdown control logic may also include establishing a rapid shutdown setpoint for the component(s). The rapid shutdown setpoint may have a value greater than the nominal operational limit such that excessive loading or damage of the component(s) is permitted.

In another aspect, the present disclosure is directed to a method for controlling a wind turbine in response to a blade liberation event. The wind turbine may have a rotor with a rotatable hub and a plurality of rotor blades mounted thereto. The method may include receiving, with the controller, data indicative of a blade liberation event from a plurality of sensors during operation of the wind turbine. In response to detecting the blade liberation event, the method may also include initiating, with the controller, a rapid shutdown control logic protect the wind turbine. The rapid shutdown control logic may include overriding a nominal operational limit of at least one component of the wind turbine. The rapid shutdown control logic may also include establishing a rapid shutdown setpoint for the component(s). The rapid shutdown setpoint may have a value greater than the nominal operational limit such that excessive loading or damage of the component(s) is permitted. Additionally, the rapid shutdown control logic may include establishing a deceleration rate of the rotor which exceeds a nominal deceleration rate of the rotor.

In an embodiment, establishing the rapid shutdown setpoint comprises at least one of generating, with the controller, a pitch setpoint command for the plurality of rotor blades, wherein the pitch setpoint command directs a pitch control mechanism to pitch the plurality of rotor blades to feather at a pitch rate exceeding a nominal pitch rate threshold, and generating, with the controller, a generator setpoint for a generator of the wind turbine, wherein the generator setpoint directs a converter controller to develop a generator torque exceeding a nominal generator torque limit.

In an additional embodiment, the rapid shutdown control logic may also include triggering, with the controller, a gearbox braking system operably coupled to a gearbox of the wind turbine.

In a further embodiment, the wind turbine may also include a high-speed shaft operably coupling the rotor to the generator via a gearbox. The gearbox may be operably coupled to the generator via a slip coupling of the high-speed shaft. The method may also include monitoring a torque level of the slip coupling. The method may further include reducing the generator setpoint when the torque level of the slip coupling approaches a release threshold of the slip coupling.

In an embodiment, the method may also include establishing a one-third reduction in a rotational speed of the rotor within 720-degrees of rotation of the rotor following detection of the blade liberation event.

In yet another aspect, the present disclosure is directed to a wind turbine. The wind turbine may include a tower, a nacelle mounted atop the tower, and a rotor mounted to the nacelle. The rotor may include a rotatable hub having a plurality of rotor blades secured thereto via a pitch drive mechanism. The wind turbine may also include a generator disposed within the nacelle and operably coupled to the rotor via a gearbox and a high-speed shaft. Additionally, the wind turbine may include a controller communicatively coupled to a plurality of sensors, the generator, and the pitch drive mechanism. The controller may include at least one processor configured to perform a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
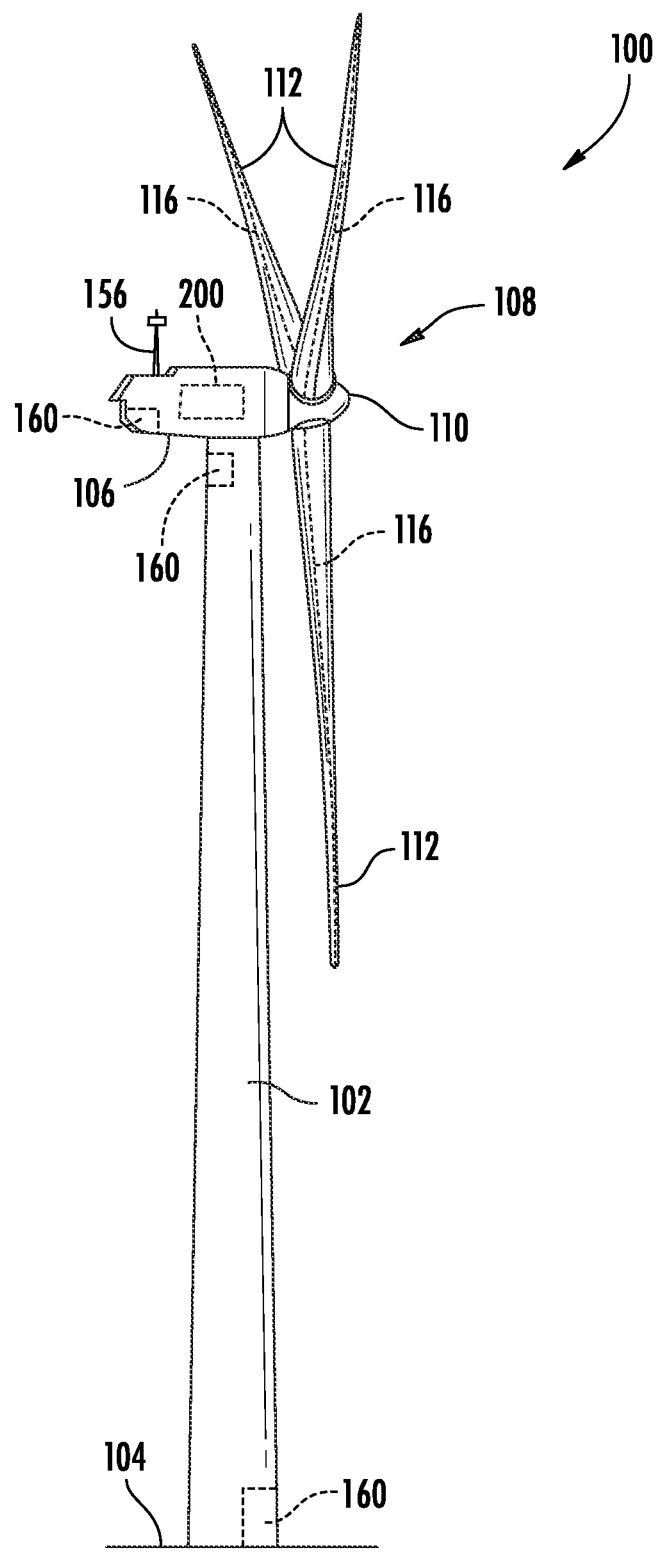
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind turbine in response to a blade liberation event, which may be considered an anomalous operational event. In particular, the present disclosure includes systems and methods which facilitate the detection of a partial or full blade departure and the rapid braking of the rotor of the wind turbine in order to protect the overall wind turbine. In accordance with the present disclosure, various estimated response signatures for the wind turbine may be modeled for various blade departure scenarios. These estimated response signatures may be compared to a number of data inputs from a number of sensors measuring a response of components of the wind turbine to a rotor loading. A blade liberation event may be indicated when at least two of the measured, actual response signatures meet or exceed the corresponding estimated response signatures. In other words, the loss of at least a portion of a rotor blade may be detected when the measured response of the wind turbine coincides with the estimated response of the wind turbine in one of the various blade departure scenarios. It should be appreciated that any single response signature may correspond to an estimated response signature without being indicative of a blade liberation event. Accordingly, the detection of a blade liberation event when multiple actual response signatures meet or exceed the corresponding estimated response signatures may preclude false alarms.

The loss of the rotor blade, either in full or in part, may result in the rotor becoming imbalanced and generating an imbalanced load that acts on the wind turbine. Continuing to operate the imbalanced rotor may result in the degradation of the wind turbine and/or its various components. Accordingly, it may be desirable to rapidly slow the rotor of wind turbine in response to the detection of a liberation event. As such, the system may, upon the detection of a liberation event, initiate a rapid shutdown control logic in order to protect the wind turbine. The rapid shutdown control logic may override a nominal operational limit of a component of the wind turbine and establish a setpoint for the component(s) which has a value greater than the nominal operational limit. As a result of operating the component(s) above the nominal operational limit, excessive loading or damage of the component(s) may be permitted in favor generating a force to slow the rotor. For example, the generator of the turbine may be operated at a generator set point which permits the generator to develop a generator torque exceeding a nominal generator torque limit. It should be appreciated that generating torque in excess of the torque limit may, for example, result in an operating temperature increase for various components of the electrical system that may degrade the components of the electrical system.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a controller 200 centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
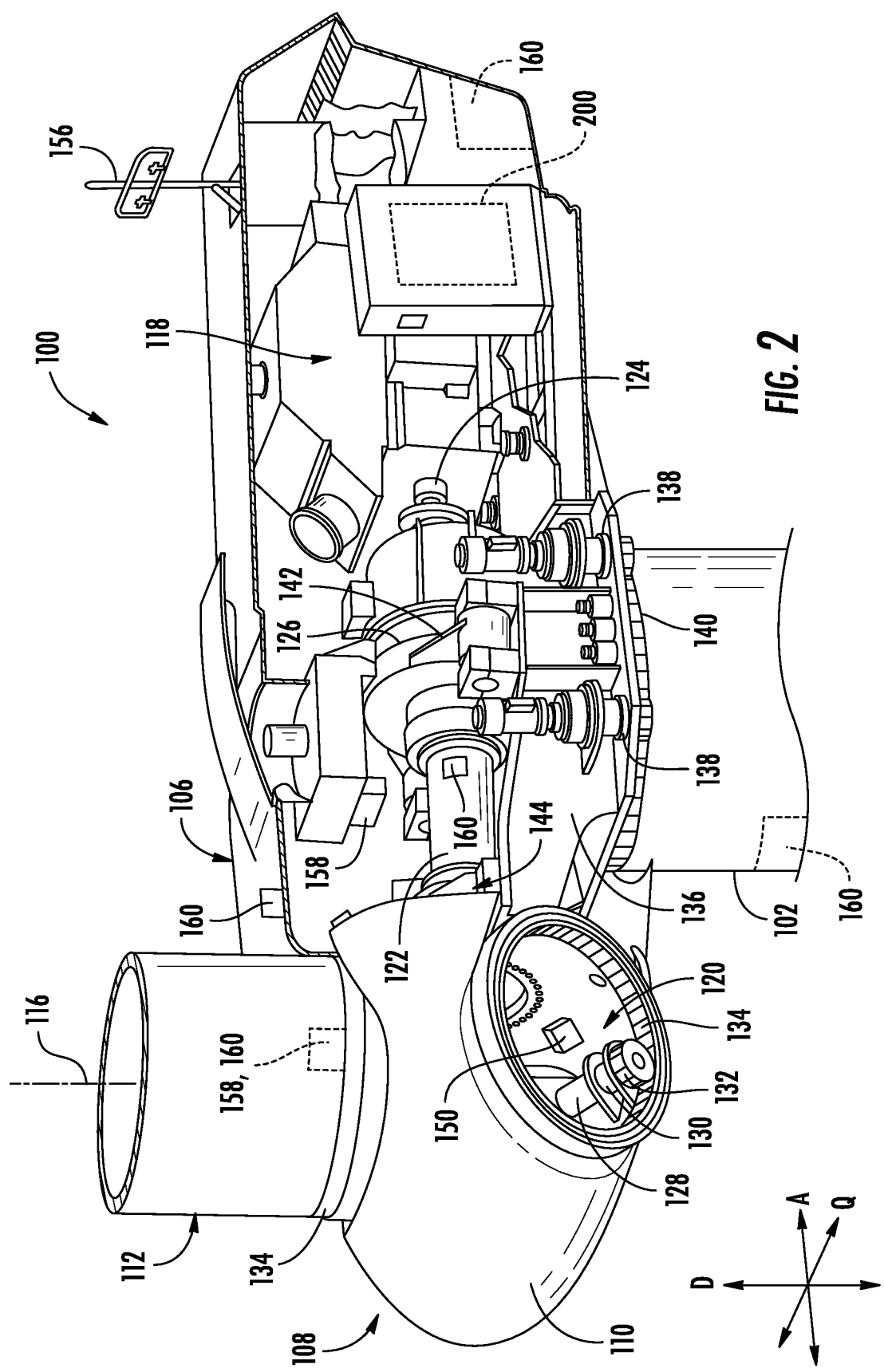
FIG. 2 illustrates a perspective, internal view of one embodiment of a nacelle of the wind turbine according to the present disclosure.
Figure 3:
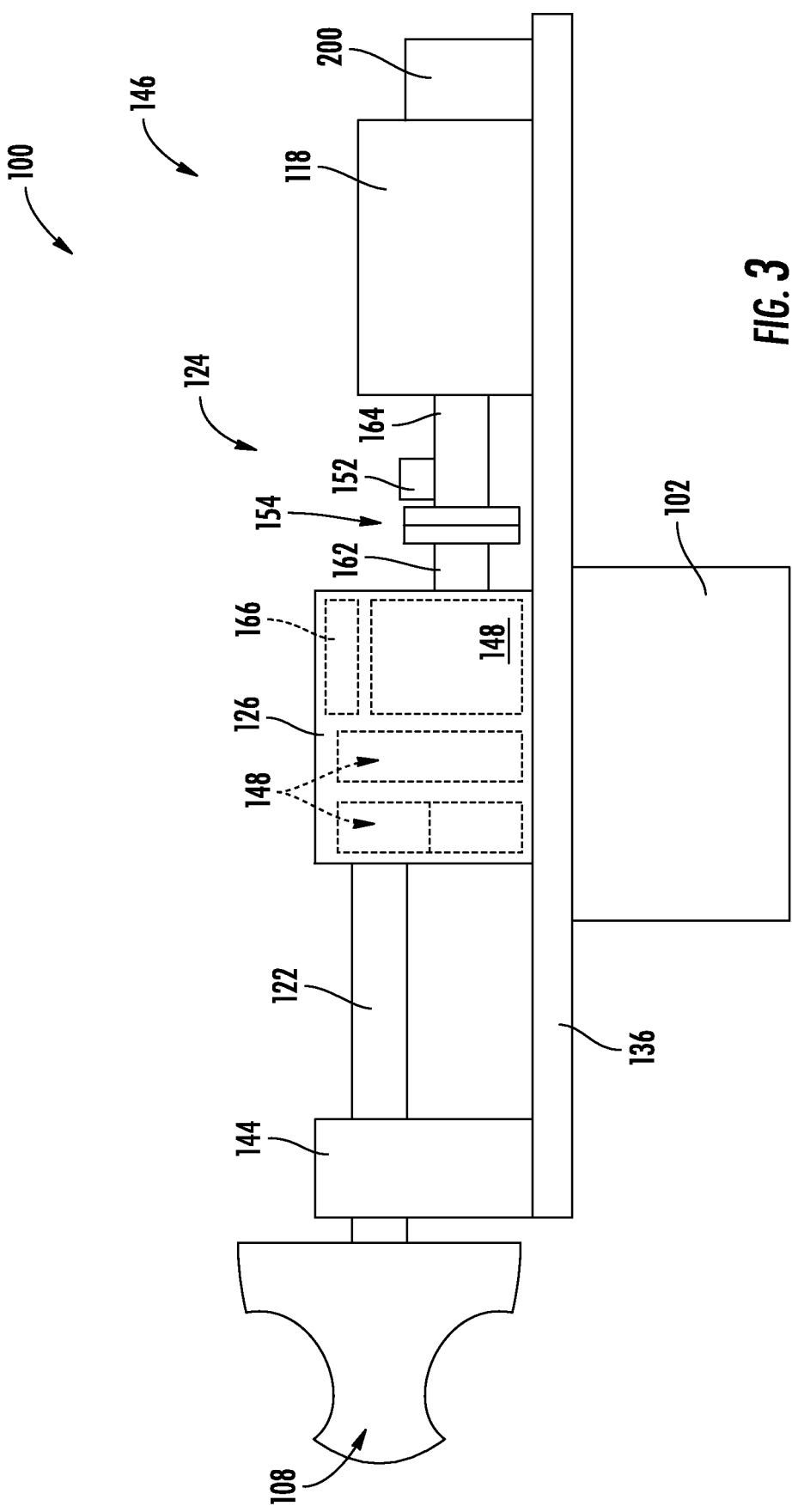
FIG. 3 illustrates a schematic diagram of one embodiment of a drivetrain of the wind turbine according to the present disclosure.

Referring now to FIGS. 2 and 3, a simplified, internal view of one embodiment of the nacelle 106 and a schematic diagram of one embodiment of a drivetrain 146 of the wind turbine 100 shown in FIG. 1 are illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through an optional gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured with a plurality of gears 148 to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

In an embodiment, the wind turbine 100 may include a brake 152 positioned so as to resist a rotation of the rotor 108. In at least one embodiment, the brake 152 may be oriented to engage the high-speed shaft 124. The brake 152 may be configured to further slow an already slowing rotor 108 and/or temporarily hold the rotor 108 stationary.

In an additional embodiment, the brake 152 may be employed in conjunction with, or as an adjunct to, other means of slowing the rotor 108. For example, in an embodiment, the rotor 108 may be slowed via a torque generated by the generator 118. As the generator 118 may generate a torque counter to the rotation of the rotor 108, the high-speed shaft 124 may be equipped with a slip coupling 154. The slip coupling 154 may prevent damage to a component of the drivetrain 146 due to overloading of the drivetrain 146. As such, the slip coupling 154 may have a release threshold above which the slip coupling 154 may permit first and second portions 162, 164 of the high-speed shaft 124 to have a different rotational velocities. It should be appreciated that, if the torsional moment at the slip coupling 154 exceeds the release threshold, the generator 118 may be communicatively decoupled from the rotor 108. In such an event, the torque developed by the generator 118 may be unavailable to slow the rotor 108.

Each rotor blade 112 may also include a pitch control mechanism 120 configured to rotate the rotor blade 112 about its pitch axis 116. The pitch control mechanism 120 may include a pitch controller 150 configured to receive at least one pitch setpoint command from the controller 200. Further, each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100).

Still referring to FIG. 2, in an embodiment, the wind turbine 100 may include an environmental sensor 156 configured for gathering data indicative of one or more environmental conditions. The environmental sensor 156 may be operably coupled to the controller 200. Thus, in an embodiment, the environmental sensor(s) 156 may, for example, be a wind vane, an anemometer, a lidar sensor, thermometer, barometer, or other suitable sensor. The data gathered by the environmental sensor(s) 156 may include measures of wind speed, wind direction, wind shear, wind gust, wind veer, atmospheric pressure, and/or temperature. In at least one embodiment, the environmental sensor(s) 156 may be mounted to the nacelle 106 at a location downwind of the rotor 108. The environmental sensor(s) 156 may, in alternative embodiments, be coupled to, or integrated with, the rotor 108. It should be appreciated that the environmental sensor(s) 156 may include a network of sensors and may be positioned away from the turbine 100.

In addition, the wind turbine 100 may include one or more operational sensors 158. The operational sensor(s) 158 may be configured to detect a performance of the wind turbine 100 in response to the environmental condition. For example, the operational sensor(s) 158 may be a rotational speed sensor operably coupled to the controller 200. The operational sensor(s) 158 may be directed at the rotor shaft 122 of the wind turbine 100. The operational sensor(s) 158 may gather data indicative of the rotational speed and/or rotational position of the rotor shaft 122, and thus the rotor 108 in the form of a rotor speed and/or a rotor azimuth. The operational sensor(s) 158 may, in an embodiment, be an analog tachometer, a D.C. tachometer, an A.C. tachometer, a digital tachometer, a contact tachometer a non-contact tachometer, or a time and frequency tachometer.

Still referring to FIG. 2, the wind turbine 100 may also include a plurality of sensors 160 for collecting data indicative of a response of the component(s) of the wind turbine 100 to a rotor loading. For example, in an embodiment, the sensor(s) 160 may be configured as a strain gauge configured to detect a tensile load on the component. In an additional embodiment, the sensor(s) 160 may include at least one of an accelerometer, a photo-optic sensor, an acoustic sensor, a transducer, a lidar system, a vibration sensor, a force sensor, a rate sensor, a piezo sensor, a position sensor, an inclinometer, and/or a torque sensor. The sensor(s) 160 may, for example, be configured to collect sensor data indicative of at least one of a nacelle acceleration, a vibration of the tower 102, a bending of the rotor shaft 122, an acoustic signature of the wind turbine 100, an occlusion of an optical sensor due to a passage of the rotor blade 112, a rotor blade 112 continuity, a horizontal (Q) and vertical (D) deflection of the rotor 108, and/or an acceleration of the rotor 108.

It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the wind turbine 100.

Figure 4:
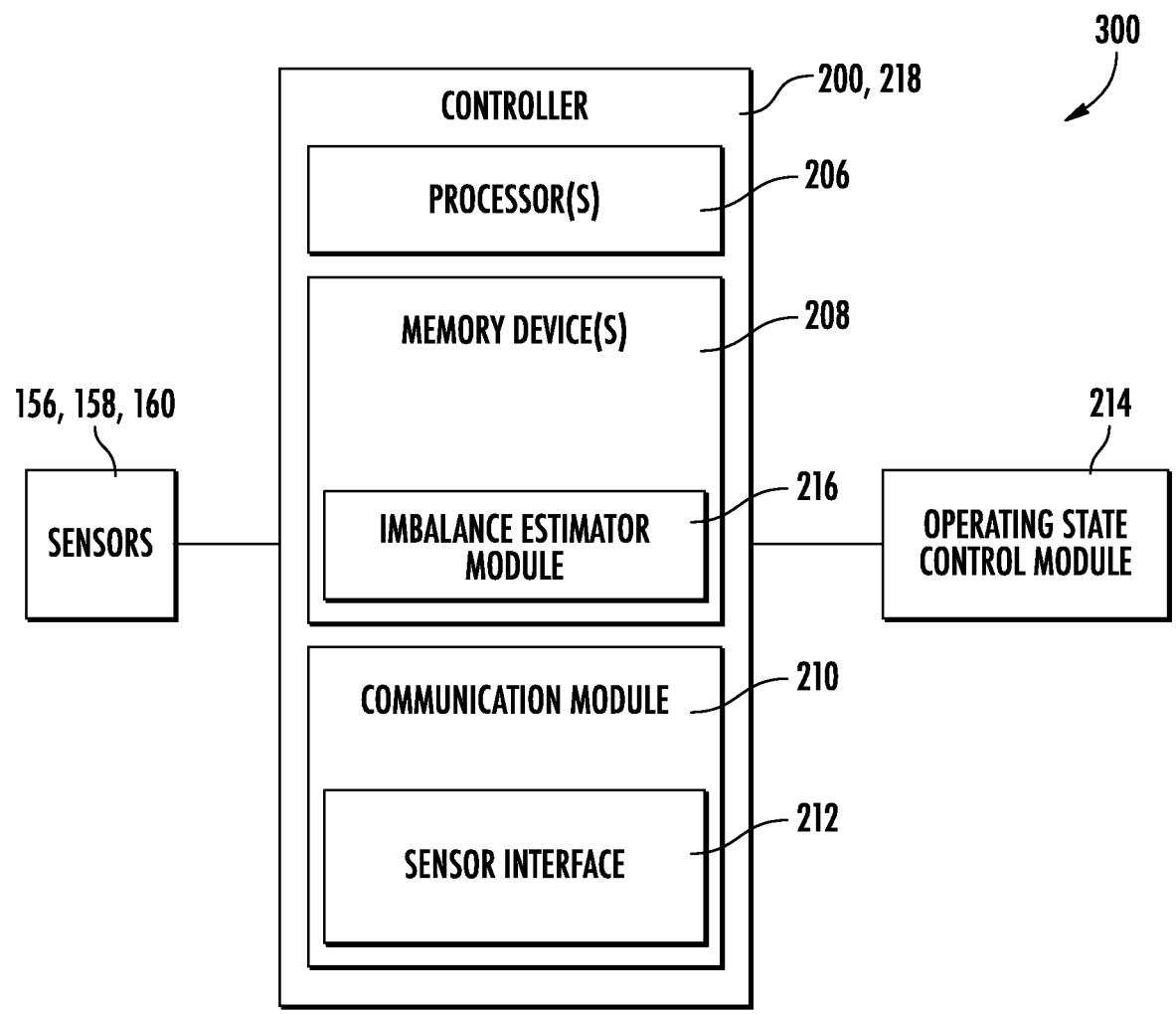
FIG. 4 illustrates a schematic diagram of one embodiment of a controller for use with the wind turbine according to the present disclosure.

Referring now to FIGS. 4-7, schematic diagrams of multiple embodiments of a system 300 for controlling the wind turbine 100 according to the present disclosure are presented. As shown particularly in FIG. 4, a schematic diagram of one embodiment of suitable components that may be included within the system 300 is illustrated. For example, as shown, the system 300 may include the controller 200 communicatively coupled to the sensor(s) 156, 158, 160. Further, as shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the wind turbine 100. Further, the communications module 210 may include a sensor interface 212 (e.g., one or more analog-to-digital converters) to permit signals transmitted from the sensor(s) 156, 158, 160 to be converted into signals that can be understood and processed by the processors 206. It should be appreciated that the sensor(s) 156, 158, 160 may be communicatively coupled to the communications module 210 using any suitable means. For example, as shown in FIG. 4, the sensor(s) 156, 158: 60 is coupled to the sensor interface 212 via a wired connection. However, in other embodiments, the sensor(s) 156, 158, 160 may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, detecting a blade liberation event and initiating a rapid shutdown control logic to protect the wind turbine 100 as described herein, as well as various other suitable computer-implemented functions.

Figure 5:
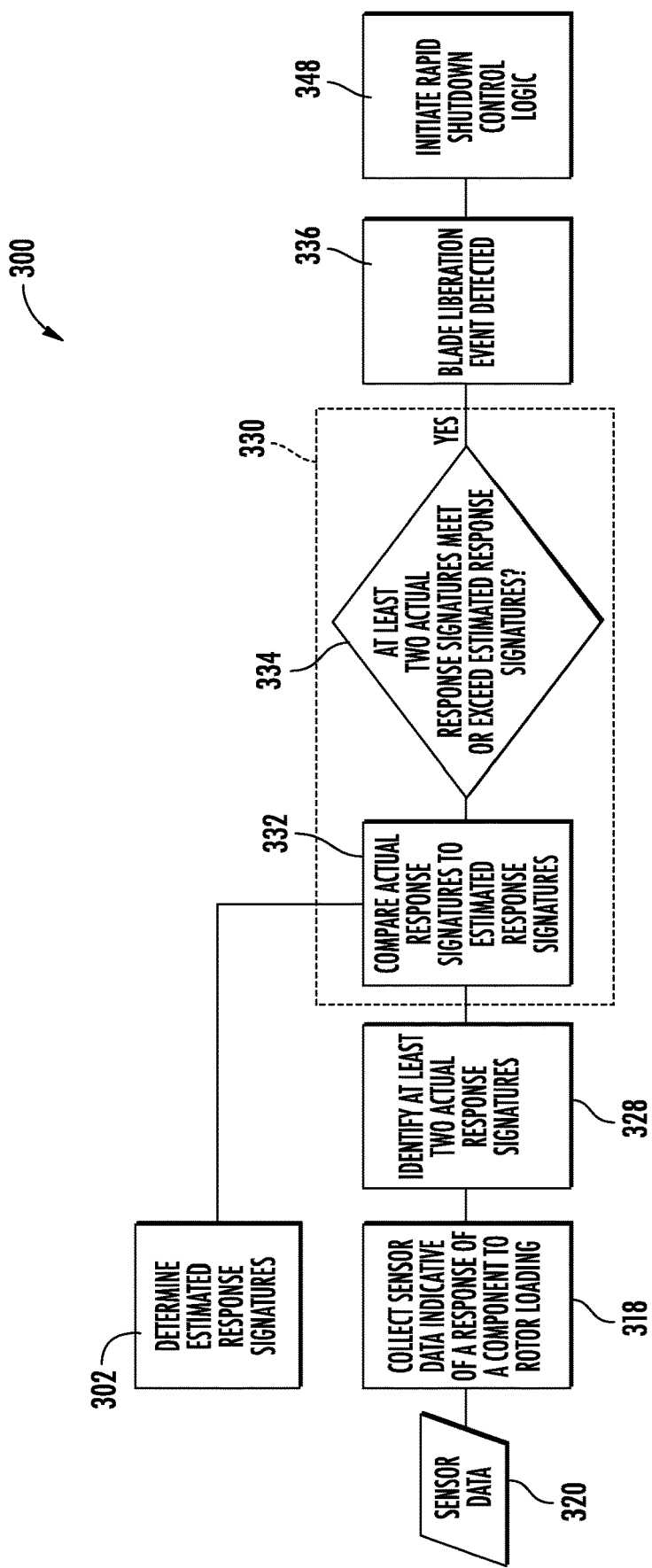
FIG. 5 illustrates a schematic diagram of one embodiment of a control logic of a system for controlling a wind turbine according to the present disclosure.
Figure 6:
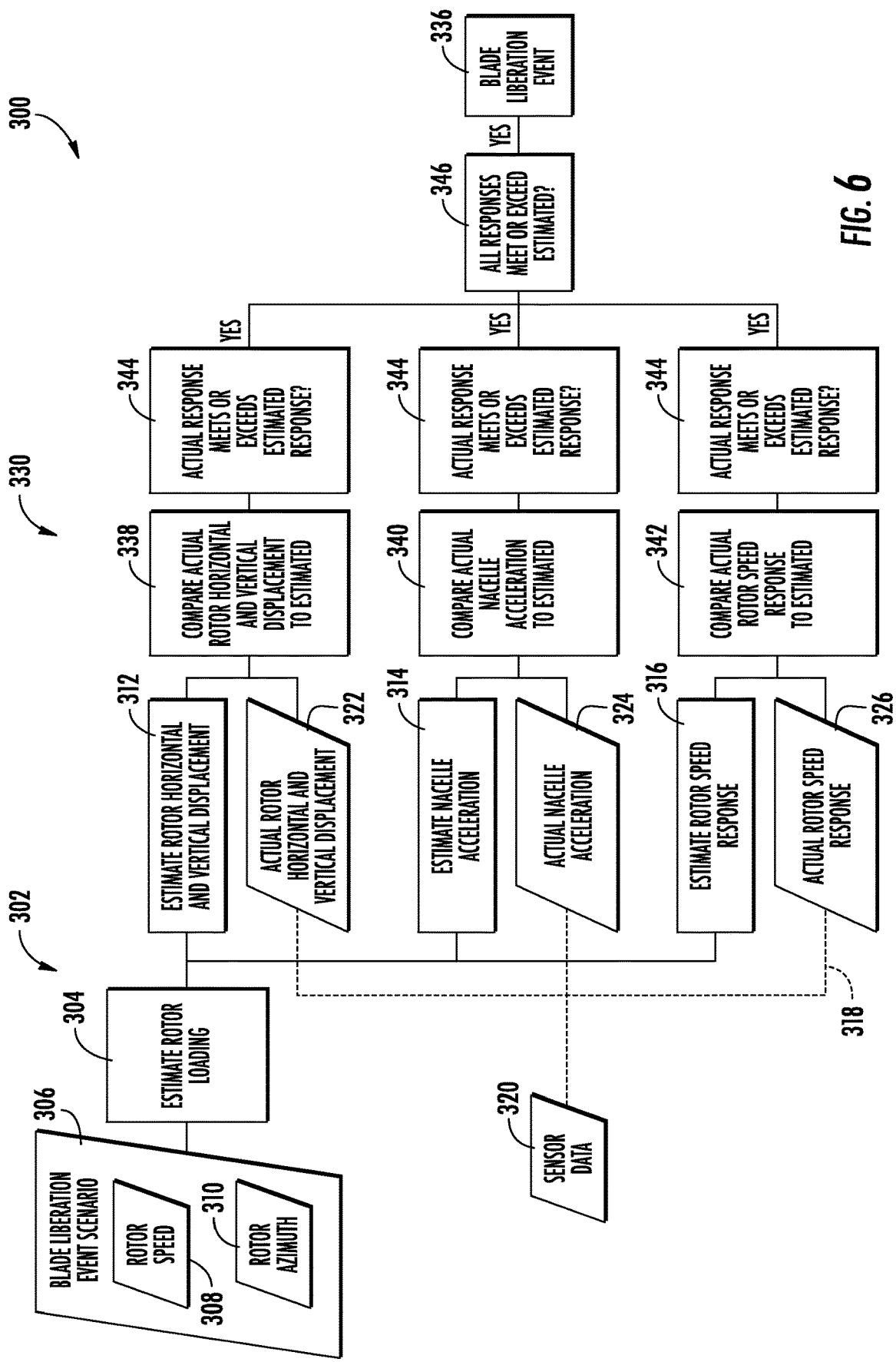
FIG. 6 illustrates a schematic diagram of one embodiment of a portion of the control logic of FIG. 5 according to the present disclosure.

Referring particularly to FIGS. 5 and 6, as shown at 302, the system 300 may be configured to determine a plurality of estimated response signatures for the wind turbine 100 corresponding to a plurality of different blade liberation event scenarios 306. For example, in an embodiment, the controller 200 may include an imbalance estimator module 216 which may estimate the response of various components of the wind turbine 100 to an estimated rotor loading 304 for a given blade liberation event scenario 306. The blade liberation event scenario 306 may be based on the loss of a portion of the rotor blade 112 when the rotor has a specified rotor speed 308 and rotor azimuth 310 at the moment of departure 108. Based on the rotor's orientation and speed at the moment of departure in a given blade liberation event scenario 306, an estimated rotor loading 304 resulting from the departure may be determined for the scenario. In another embodiment, a range of potential blade liberation event scenarios 306 may be modeled and the resultant potential rotor loading for each of the scenarios may be assembled in a lookup table and stored within the imbalance estimator module 216.

In an additional embodiment, the imbalance estimator module 216 may include an algorithm whereby an estimated rotor loading 304 may be computed based at least on data indicative of the rotor speed 308 and rotor azimuth 310 received from the operating sensor(s) 158. In such an embodiment, the controller 200 of the system 300 may be configured to continuously compute an estimated rotor loading 304 due to a potential loss of at least a portion of the rotor blade 112 based on the real-time performance data of the wind turbine 100.

In an embodiment, the imbalance estimator module 216 may utilize the estimated rotor loading 304 to determine estimated response signatures 302 for various components of the wind turbine 100. In other words, the imbalance estimator module 216 may predict the how the reaction of various components of the wind turbine 100 to the imbalanced load may be reflected by data from the plurality of sensors 160. For example, as depicted at 312, the system 300 may estimate a horizontal (Q) and a vertical (D) displacement of the rotor 108 (which may be expressed as a predicted acceleration vector) in response to the load on the rotor 108 in a blade liberation event scenario 306. In an additional embodiment, the system 300 may, at 314, estimate an acceleration of the nacelle 106 of the wind turbine 100 in response to the estimated rotor loading 304. This response of the nacelle 106 may include an oscillation direction, an oscillation frequency, and an oscillation magnitude of the nacelle 106 in response to the imbalanced load. In a further embodiment, the system 300 may, at 316, determine an estimated response signature which includes a rotor speed response. In at least one embodiment, the rotor speed response may be indicative of an acceleration or deceleration of the rotor 108 in response to a rotor mass balance and a rotational position of the rotor 108 at the moment of the loss of at least a portion of the rotor blade 112 in the blade liberation scenario 306.

It should be appreciated that, in an embodiment, the estimated response signatures for the components of wind turbine 100 corresponding to the different blade liberation event scenarios 306 may be modeled and the resultant potential rotor loading for each of the scenarios may be assembled in a lookup table and stored within the controller 200. In an additional embodiment, the imbalance estimator module 216 may include an algorithm whereby the estimated response signatures for the components may be computed based on the continuously computed estimated rotor loading 304.

Referring still to FIGS. 5 and 6, as shown at 318, the system 300 may be configured to collect sensor data 320 via the sensor(s) 160 during operation of the wind turbine 100. The sensor data 320 may be indicative of a response of the components of the wind turbine 100 to an actual loading of the rotor 108 while in operation.

In an embodiment, the sensor data 320 may reflect the components' response to the rotor load in the form of a load magnitude and/or load direction. For example, in an embodiment, the load direction may be along, or reciprocal to, a pitch axis 116. In such an embodiment, a load which is reciprocal to a pitch axis 116 may be indicative of a loss of at least a portion of a rotor blade 112. In an additional embodiment, the sensor data 320 may indicate an acceleration vector of the component, such as the nacelle 106, the tower 102, or the rotor 108. The sensor data 320 may also include a vibration signature, which may be a first excitation frequency, corresponding to a blade liberation event. The vibration signature may, in various embodiments, be indicative of a vibration level/signature in the rotor blade 112, the hub 110, the nacelle 106, a base and/or top of the tower 102, and/or any other component of the wind turbine 100. It should be appreciated that the first excitation frequency may be the first frequency corresponding to the rotational frequency of the rotor 108.

In an additional embodiment, the sensor data 320 may indicate a communication loss with at least one of the sensors of the sensor(s) 160. For example, the liberation event may also sever a communication coupling of one of the sensor(s) 160 (e.g, a strain gauge, temperature sensor, vibration sensor, piezo sensor, etc.) coupled to the rotor blade 112. In a further embodiment, the sensor data 320 may include an acoustic signature of the wind turbine. In such an embodiment, a change in the acoustic signature of the wind turbine 100 may be indicative of the liberation event. In yet a further embodiment, the sensor data 320 may indicate a bending moment affecting the rotor shaft 122 and/or the tower 102. It should be appreciated that an increase in the bending moment may be indicative of an imbalanced load generated by the rotor 108 in response to a blade liberation event. It should further be appreciated that the sensor data 320, as collected by the sensors 158, 160, may include additional signatures and/or combinations of signatures indicative of a response of the components of the wind turbine 100 to an actual rotor loading.

As depicted in FIG. 6 at 322, in an embodiment, the acceleration vector indicated by the sensor data 320 may correspond to the actual horizontal (Q) and vertical (D) displacement of the rotor 108 in response to the load on the rotor 108. Additionally, the sensor data 320 may correspond to an out-of-plane imbalance of the rotor 108. For example, the loss of at least a portion of the rotor blade 112 may result in the rotor 108 developing an off-axis loading. The off-axis loading may generate a bending moment which may be transmitted via the hub 110 to the rotor shaft 122. The bending moment may be manifest by the vertical (D) and/or the horizontal (Q) displacement of the rotor 108 relative to a nominal rotor position which is balanced about the axis (A) of the rotor 108.

As depicted in FIG. 6, in an additional embodiment, a plurality of acceleration vectors corresponding to the responses of different components of the wind turbine 100 may be indicated by the sensor data 320. As depicted at 324, in an embodiment, one of the acceleration vectors may correspond to an actual acceleration of the nacelle 106 in response to the actual load on the rotor 108 in response to a blade liberation event. In an embodiment, the response of the nacelle 106 may include an oscillation direction, an oscillation frequency, and an oscillation magnitude of the nacelle 106 in response to the imbalanced load. For example, the liberation of a portion of a rotor blade may result in a rotor mass imbalance wherein the center of mass of the rotor 108 may shift from the axis (A) to a point on an ark defined between the remaining complete rotor blade(s) 112. In response to the rotor mass imbalance, the nacelle 106 may accelerate in the direction of the shifted center of mass of the rotor 108. However, as the rotor 108 continues to rotate, the position of the shifted center of mass may traverse an arc so that the nacelle 106 is accelerated in the opposite direction from the initial acceleration. In an embodiment, the system 300 may be configured to correlate the frequency and amplitude of the nacelle 106 acceleration to the actual load on the rotor 108. It should be appreciated that by correlating the acceleration vector of the nacelle 106 to the actual load on the rotor 108, the system 300 may distinguish an acceleration vector resulting from a blade liberation event from an acceleration vector corresponding to other forces, such as a wind gust.

As depicted in FIG. 6 at 326, in an embodiment, the acceleration vector indicated by the sensor data 320 may correspond to the actual rotor speed response. In an embodiment, the rotor speed response may be indicative of an acceleration and/or deceleration of the rotor 108 in response to a rotor mass imbalance and a rotational position of the rotor 108. For example, where the liberation event results in the center of mass of the rotor 108 shifting from the axis (A), the resultant rotor mass imbalance may result in an acceleration of the rotor when the shifted center of mass is located on a descending arc of the rotor 108. Furthermore, as the shifted center of mass passes through vertical, and transitions to an ascending arc, the shifted center of mass may be acted upon by gravitational forces which may lead to a slowing of the rotor 108. Accordingly, in an embodiment, the system 300 may be configured to detect the liberation event based, at least in part, on the periodic acceleration and deceleration of the rotor 108 as the rotor 108 rotates through 360-degrees.

Referring particularly to FIG. 5, as shown at 328, the system 300 may be configured to identify at least two (e.g., three or more) actual response signatures within the sensor data 320. The actual response signatures may be indicative of the blade liberation event. For example, in an embodiment, the controller may be configured to detect whenever any of the inputs from the sensor(s) 160 crosses a predetermined threshold indicating the potential for the blade liberation event. In an additional embodiment, the system 300 may be configured to filter the sensor data 320 so as to focus on a filtered plurality of inputs which modeling may predict will accurately and/or quickly indicate the liberation event. It should be appreciated that identifying at least two actual response signatures within the sensor data 320 may mitigate the likelihood of a false alarm by providing the system 300 with multiple actual response signatures that may be indicative of the loss of at least a portion of the rotor blade 112.

As shown at 330, the system 300 may also be configured to determine whether at least two actual response signatures equal or exceed two or more corresponding estimated response signatures of the plurality of estimated response signatures so as to determine the presence of the blade liberation event. As such, the system 300 may, at 332, compare the actual response signatures indicated by the sensor data 320 to the corresponding estimated response signatures. The system 300 may, at 334, be configured to determine whether at least two, if not more, of the actual response signatures exceed the estimated response signatures for any of the blade liberation event scenarios 306. In an embodiment wherein at least two of the actual response signatures of the component(s) of the wind turbine 100 at least meet the corresponding estimated response signatures, the system 300 may, at 336, determine that a blade liberation event has occurred.

By way of illustration, in an embodiment, the system 300 may, as depicted in FIG. 6, determine whether three actual response signatures equal or exceed three or more corresponding estimated response signatures for any of the various blade liberation event scenarios 306. For example, the system 300 may, compare at 338 the actual rotor horizontal (Q) and vertical (D) displacement 322 to the estimated rotor horizontal (Q) and vertical (D) displacements 312. Simultaneously, the system 300 may, at 340, compare the actual nacelle acceleration 324 to the estimated nacelle accelerations 314. Additionally, the system 300 may simultaneously at 342, compare the actual rotor speed response 326 to the estimated rotor speed responses 316. As depicted at 344, the system 300 may then determine whether each of the actual response signatures meet or exceed the corresponding estimated response signatures. In an embodiment, the system 300 may, at 346, be configured to detect a blade liberation event only when all of the actual responses meet or exceed the estimated responses for a blade liberation event scenario 306.

It should be appreciated that the utilization of multiple actual response signatures from multiple sensors of the sensor(s) 160 may facilitate the rapid detection of the blade liberation event. Specifically, the response of the wind turbine 100 to different blade liberation event scenarios 306 may vary. For example, in an embodiment, the actual response signature for a component of the wind turbine 100 may be within normalcy bounds at the outset of one blade liberation event scenario 306 while presenting an easily detectable departure from the normalcy bounds in another blade liberation event scenario 306. Accordingly, the utilization of multiple sensors gathering operational data from various components of the wind turbine 100 may serve to limit delays in the detection of blade liberation event.

It should also be appreciated that it may be equally desirable to increase the reliability of any blade liberation event detection by limiting false detections and reporting. This increase in the reliability of detection may be facilitated by the requirement that at least two of the actual response signatures meet or exceed corresponding estimated response signatures. Thus, by employing a plurality of sensors and requiring two more actual response signatures consistent with predicted response signatures, the speed and reliability of blade liberation detection may be increased over systems requiring fewer sensors and/or fewer response signatures.

In an embodiment, the system 300 may determine a type of blade liberation event based on the actual response signatures. For example, in an embodiment, the magnitude of the acceleration of the nacelle 106 and the rotor speed response may indicate that an entire blade 112 has become decoupled from the hub 110. However, where the magnitude of the acceleration and the rotor speed response may be less than the magnitude predicted for a complete blade departure, a partial blade liberation may be indicated. In an embodiment, the actual response signatures may correspond to a blade liberation event when the lost portion of the blade 112 exceeds 25% of a rotor blade span when the wind turbine 100 is at rated power. In an additional embodiment, the actual response signatures may correspond to a blade liberation event the lost portion of the blade 112 exceeds 50% of the rotor blade span when the wind turbine 100 is operating at less than rated power.

Figure 7:
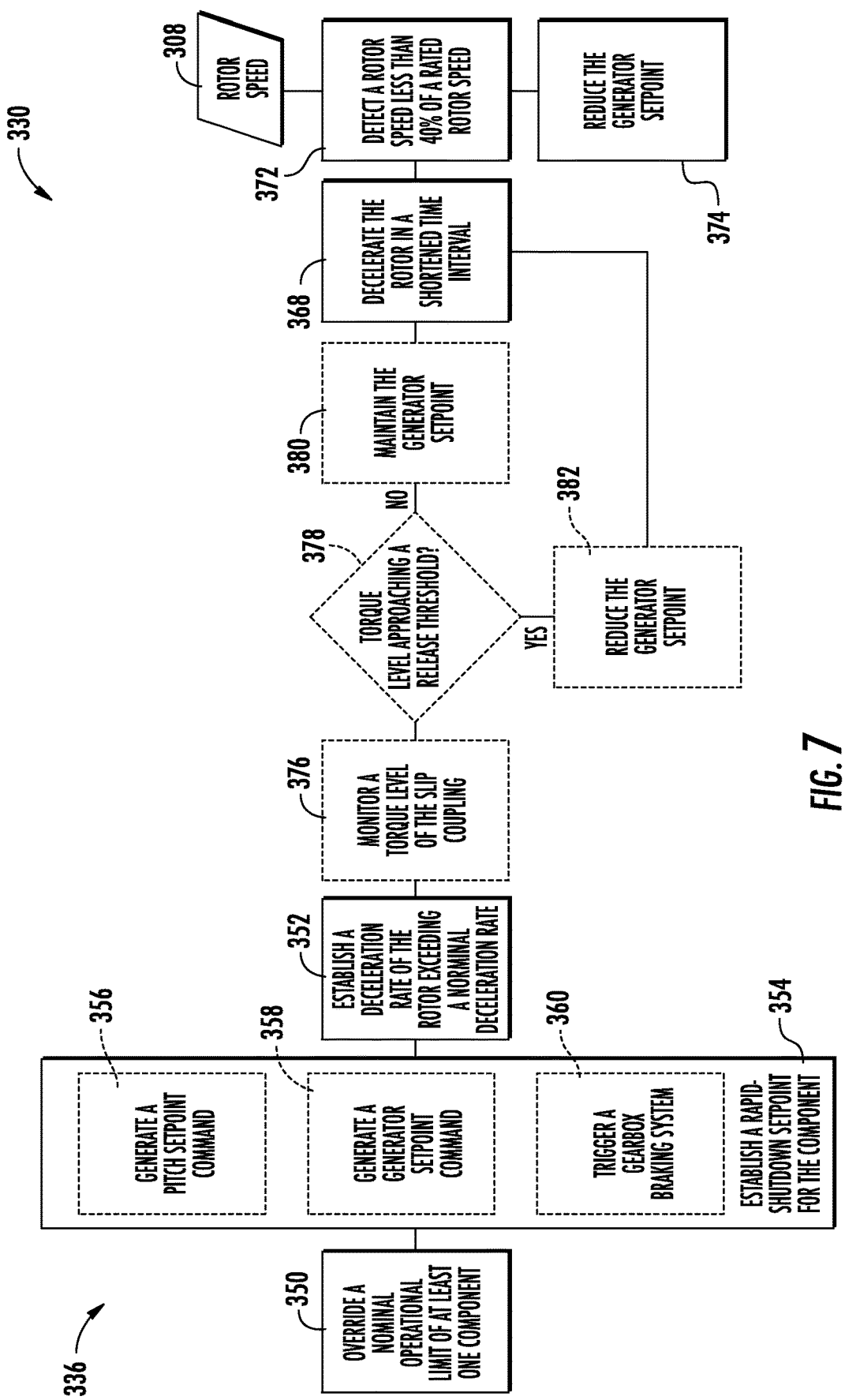
FIG. 7 illustrates a schematic diagram of one embodiment of a portion of the control logic of FIG. 5 according to the present disclosure.

Referring again to FIG. 6 and also to FIG. 7, the controller 200 may, as depicted at 348, initiate a rapid shutdown control logic to protect the wind turbine 100 in response to detecting the blade liberation event. In an embodiment, the rapid shutdown control logic may be configured to decelerate the rotor 108 in a shortened time interval relative to a nominal shutdown control logic by establishing, at 352, a deceleration rate of the rotor 108 which exceeds a nominal deceleration rate of the rotor 108. It should be appreciated that establishing the deceleration rate of the rotor 108 may require the development of a maximal force in opposition to the rotation of the rotor 108. Such a resistive/braking force may be developed by the component(s) of the wind turbine 100. Additionally, in an embodiment the initiation of the rapid shutdown control logic may coincide with the generation of an alert signal by the system 300.

As depicted at 350 in FIG. 7, implementing the rapid shutdown control logic may include overriding a nominal operational limit of at least one component of the wind turbine 100. The nominal operational limit may be a component design limit computed to preserve a maximal usable life of the component. For example, the nominal operational limit may correspond to a temperature limit, a torque limit, a load limit, a positional limit, a power limit, an engagement limit and/or any other relevant limit or combination of limits.

In an embodiment, the system 300 may, at 354, establish a rapid shutdown setpoint for the component(s). In an embodiment, the rapid shutdown setpoint may have a value greater than the nominal operational limit of the component. It should be appreciated that establishing the rapid shutdown setpoint above the nominal operational limit may permit excessive loading or damage of the component. It should be further appreciated that accepting the excessive loading or damage of the component(s) may be done in favor of rapidly slowing the rotor 108 following a blade liberation event.

As shown at 356, in an embodiment, the controller 200 of the system 300 may be configured to generate a pitch setpoint command for the plurality of rotor blades 112. The pitch setpoint command may direct the pitch control mechanism 120 to pitch the rotor blades 112 about the pitch axis 116 toward feather at a pitch rate exceeding a nominal pitch rate threshold. In other words, the controller 200 may direct that the rotor blades 112 be pitched away from power in as rapid a manner as the pitch control mechanism 120 is capable of producing without regard for potential damage to the pitch control mechanism 120. It should be appreciated that pitching the rotor blades 112 to feather may limit the amount of rotational velocity imparted to the rotor 108 in response to a flow of wind over the rotor blades 112.

Further, as shown at 358, in an additional embodiment, the controller 200 of the system 300 may be configured to generate a generator setpoint for the generator 118 of the wind turbine 100. The generator setpoint may direct a converter controller 218 to develop a generator torque exceeding a nominal generator torque limit. In other words, the controller 200 may direct the converter controller 218 to generate a maximal amount of torque without regard to a potential for damaging components of the electrical system of the wind turbine. For example, the generation of torque at the generator setpoint may result in thermal damage to at least one component of the electrical system of the wind turbine 100.

In an additional embodiment, the rapid shutdown control logic may include additional means for decelerating the rotor 108. For example, in an embodiment as depicted at 360, the controller 200 may trigger a gearbox braking system 166 operably coupled to the gearbox 126. The gearbox braking system 166 may be an apparatus configured to engage the gears 148 of the gearbox 126 and restrict the rotation of the gears 148. For example, in an embodiment, the gearbox braking system 166 may include a pawl, or other similar structure, positioned adjacent to at least one of the gears 148. When the gearbox braking system 166 is triggered by the controller 200, the pawl may be driven into the gear(s) 148 to engage and grip the teeth of the gear(s) 148. In an embodiment, the pawl may be constructed of a sacrificial material which may significantly slow the rotation of the gear(s) 148, and thus the rotor 108. In a further embodiment, the gearbox braking system 166 may be configured to introduce a highly viscous fluid into the gearbox 126. For example, the gearbox braking system 166 may introduce a foam, a slurry, an emulsion, a resin, an adhesive, and/or other suitable materials having a viscosity which may significantly slow the rotation of the gears 148.

In an embodiment, the system 300 may be configured to simultaneously employ more than one of the braking approaches disclosed herein. For example, in an embodiment, the system 300 may simultaneously activate the brake 152, generate the pitch setpoint command, generate the generator setpoint command, and trigger the gearbox braking system.

Figure 8:
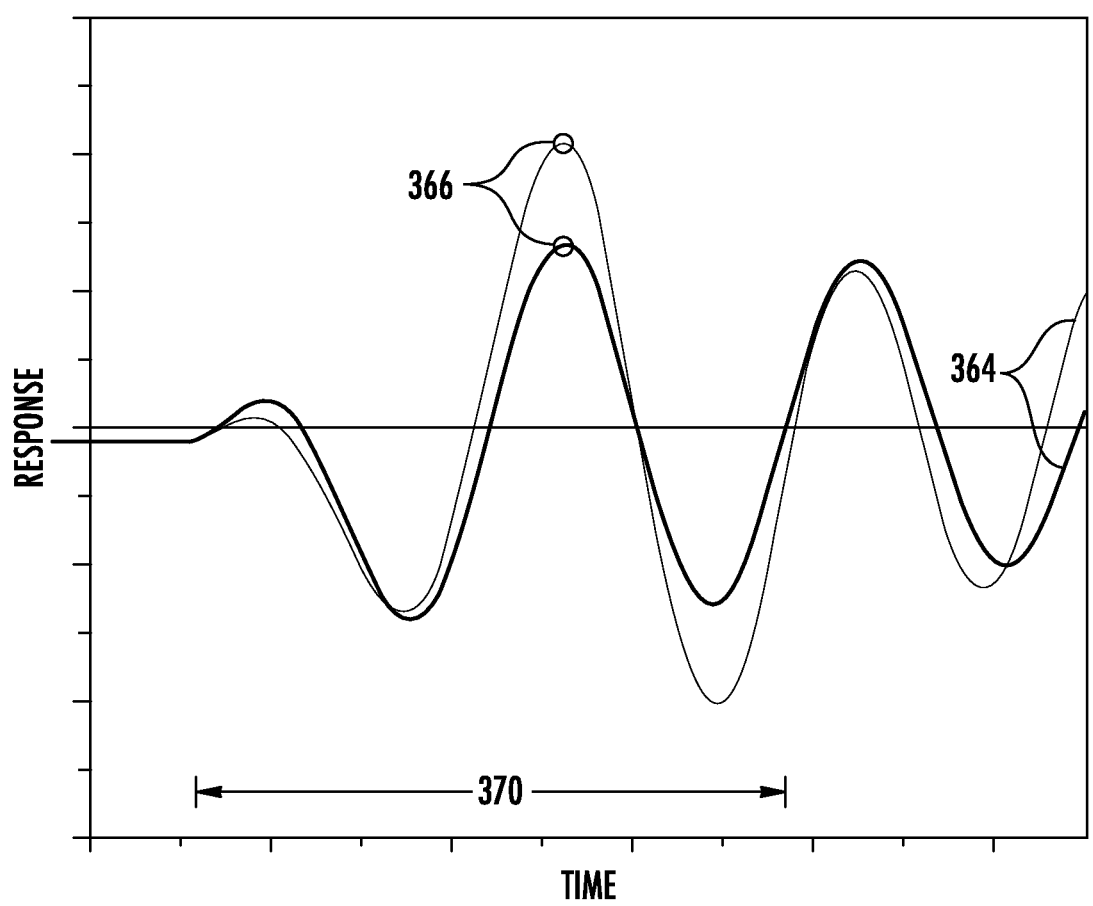
FIG. 8 illustrates a graphical representation of one embodiment of a response of the wind turbine to a blade liberation event according to the present disclosure.

Referring now to FIG. 8, wherein a graphical representation of one embodiment of a response of the wind turbine 100 to a blade liberation event is depicted. In FIG. 8, the first curve 362 may depict a response of a component of the wind turbine 100 to a blade liberation event without the implementation of the rapid shutdown control logic. In contrast, the second curve 364 may depict a response of the component(s) when the response is damped by the implementation of the rapid shutdown control logic in accordance with the present disclosure. As depicted in FIG. 8, the employment of the system 300 may reduce a maximal component response 366. For example, in an embodiment wherein curve 364 represents a horizontal (Q) displacement of the nacelle 106, the maximal component response 366 may indicate a horizontal (Q) displacement of greater than 2 meters (m) in response to a blade liberation event. However, for the same blade liberation event, the establishment of the deceleration rate of the rotor 108 exceeding the nominal deceleration rate, at 352, may result in a maximal component response 366 of less than 1.5 m.

In an additional embodiment, the system 300 may, at 368, decelerate the rotor in a shortened time interval 370. The shortened time interval 370 may represent two oscillations of the component(s) following the blade liberation event. For example, in an embodiment, the system 300 may, through the implementation of the rapid shutdown control logic, establish a one-third reduction in rotor speed 308 within two oscillations of the nacelle 106 in response to the loss of at least a portion of the rotor blade 112. Two oscillations of the nacelle 106 may correspond to 720-degrees of rotation of the rotor 108.

Referring again to FIG. 7, as depicted at 372, the controller 200 may detect a speed of the rotor 108 which is less than 40% of a rated speed of the rotor 108. In other words, from the instant of detection of a blade liberation event, the system 300 may apply such force as is available to decelerate the rotor in as short a time interval 370 as is possible. However, as discussed previously, this force may be generated in such a manner as reduces the maximal usable life of the component(s) of the wind turbine 100. Accordingly, as is shown at 374, when the speed of the rotor 108 is less than 40% of the rated speed, the controller 200 may reduce the generator setpoint for the generator 118 so as to reduce the generator torque. Reducing the generator setpoint may establish a generator torque level below the nominal generator torque limit.

As depicted at 376, in an embodiment, the system 300 may be configured to monitor a torque level of the slip coupling 154. It should be appreciated that in an embodiment wherein the torque level of the slip coupling 154 exceeds the nominal release threshold of the slip coupling 154, the slip coupling 154 may operably decouple the generator 118 from the rotor shaft 122. In such an embodiment, the torque developed by the generator 118 may then be unavailable to assist with the slowing of the rotor 108. Accordingly, the system 300 may, at 378 detect the approach of the torque level to a release threshold. In the event the torque level does not approach the release threshold, the system 300 may, at 380, maintain the generator setpoint so as to continue decelerating the rotor in a shortened time interval. However, in an embodiment wherein the torque level of the slip coupling 154 approaches the release threshold, the system 300 may, at 382, reduce the generator setpoint so as to maintain the operable coupling between the generator 118 and the rotor 108.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses: clause Clause 1. A method for controlling a wind turbine in response to a blade liberation event, the wind turbine having a rotor with a rotatable hub and a plurality of rotor blades mounted thereto, the method comprising: determining a plurality of estimated response signatures for the wind turbine corresponding to a plurality of different blade liberation events; collecting sensor data via a plurality sensors during operation of the wind turbine, the sensor data being indicative of a response of at least one component of the wind turbine to an actual rotor loading; identifying at least two actual response signatures within the sensor data; determining whether the at least two actual response signatures equal or exceed two or more corresponding estimated response signatures of the plurality of estimated response signatures so as to determine the presence of a blade liberation event; and in response to detecting the blade liberation event, initiating, with a controller, a rapid shutdown control logic to protect the wind turbine.

Clause 2. The method of clause 1, wherein the plurality of response signatures comprise at least one of a load magnitude, a direction of the load being along a pitch axis, an acceleration vector of the at least one component, a first excitation frequency, a sensor communication loss, an acoustic signature corresponding to blade liberation, a vibration signature corresponding to blade liberation, a bending moment affecting a rotor shaft or a tower of the wind turbine, or a combination thereof.

Clause 3. The method of any preceding clause, wherein the acceleration vector of the at least one component comprises: a horizontal and a vertical displacement of the rotor in response to the load on the rotor.

Clause 4. The method of any preceding clause, wherein the acceleration vector of the at least one component comprises: an acceleration of a nacelle of the wind turbine in response to the wind loading, wherein the nacelle acceleration comprises an oscillation direction, an oscillation frequency, and an oscillation magnitude of the nacelle.

Clause 5. The method of any preceding clause, wherein the acceleration vector of the at least one component comprises: a rotor speed response, wherein the rotor speed response is indicative of an acceleration or deceleration of the rotor in response to a rotor mass balance and rotational position.

Clause 6. The method of any preceding clause, further comprising: determining a type of blade liberation event based on the at least two actual response signatures, wherein the type of the blade liberation event comprises a departure of at least a portion of one of the plurality of rotor blades.

Clause 7. The method of any preceding clause, wherein the rapid shutdown control logic comprises decelerating the rotor in a shortened time interval relative to a nominal shutdown control logic.

Clause 8. The method of any preceding clause, wherein the rapid shutdown control logic comprises: overriding a nominal operational limit of at least one component of the wind turbine; and establishing a rapid shutdown setpoint for the at least one component, wherein the rapid shutdown setpoint has a value greater than the nominal operational limit such that excessive loading or damage of the at least one component is permitted.

Clause 9. A method for controlling a wind turbine in response to a blade liberation event, the wind turbine having a rotor with a rotatable hub and a plurality of rotor blades mounted thereto, the method comprising: receiving, with a controller, data indicative of a blade liberation event from a plurality of sensors during operation of the wind turbine; and in response to detecting the blade liberation event, initiating, with the controller, a rapid shutdown control logic to protect the wind turbine, the rapid shutdown control logic comprising: overriding a nominal operational limit of at least one component of the wind turbine, establishing a rapid shutdown setpoint for the at least one component, wherein the rapid shutdown setpoint has a value greater than the nominal operational limit such that excessive loading or damage of the at least one component is permitted, and establishing a deceleration rate of the rotor which exceeds a nominal deceleration rate of the rotor.

Clause 10. The method of any preceding clause, wherein establishing the rapid shutdown setpoint comprises at least one of: generating, with the controller, a pitch setpoint command for the plurality of rotor blades, wherein the pitch setpoint command directs a pitch control mechanism to pitch the plurality of rotor blades to feather at a pitch rate exceeding a nominal pitch rate threshold; and generating, with the controller, a generator setpoint for a generator of the wind turbine, wherein the generator setpoint directs a converter controller to develop a generator torque exceeding a nominal generator torque limit.

Clause 11. The method of any preceding clause, wherein the rapid shutdown control logic further comprises: triggering, with the controller, a gearbox braking system operably coupled to a gearbox of the wind turbine.

Clause 12. The method of any preceding clause, wherein the wind turbine further comprises a high-speed shaft operably coupling the rotor to the generator via a gearbox, the gearbox being operably coupled to the generator via a slip coupling of the high-speed shaft, the method further comprising: monitoring a torque level of the slip coupling; and reducing the generator setpoint when the torque level of the slip coupling approaches a release threshold of the slip coupling.

Clause 13. The method of any preceding clause, further comprising: establishing a one-third reduction in a rotational speed of the rotor within 720-degrees of rotation of the rotor following detection of the blade liberation event.

Clause 14. A wind turbine, comprising: a tower; a nacelle mounted atop the tower; a rotor mounted to the nacelle, the rotor comprising a rotatable hub having a plurality rotor blades secured thereto via a pitch drive mechanism; a generator disposed within the nacelle and operably coupled to the rotor via a gearbox and a high-speed shaft; and a controller communicatively coupled to a plurality of sensors, the generator, and the pitch drive mechanism, the controller comprising at least one processor configured to perform a plurality of operations, the plurality of operations comprising: collecting sensor data via the plurality sensors during operation of the wind turbine, the sensor data being indicative of a response of a component of the wind turbine to a rotor loading, identifying at least two actual response signatures within the sensor data, determining whether the at least two actual response signatures equal or exceed two or more corresponding estimated response signatures of a plurality of estimated response signatures so as to determine the presence of a blade liberation event, wherein the plurality of estimated response signatures correspond to a plurality of different blade liberation events, and in response to detecting the blade liberation event, initiating, with a controller, a rapid shutdown control logic to protect the wind turbine.

Clause 15. Wind turbine of any preceding clause, wherein the plurality of response signatures comprise at least one of a load magnitude, a direction of the load being along a pitch axis, an acceleration vector of the at least one component, a first excitation frequency, a sensor communication loss, an acoustic signature corresponding to blade liberation, a vibration signature corresponding to blade liberation, a bending moment affecting a rotor shaft or a tower of the wind turbine, or a combination thereof.

Clause 16. The wind turbine of any preceding clause, the plurality of response signatures comprises a plurality of acceleration vectors, the plurality of acceleration vectors comprising: an acceleration of the nacelle in response to the wind loading, wherein the nacelle acceleration comprises an oscillation direction, an oscillation frequency, and oscillation magnitude of the nacelle; a horizontal and a vertical displacement of the rotor in response to the load on the rotor; and a rotor speed response, wherein the rotor speed response is indicative of an acceleration or deceleration of the rotor in response to a rotor mass balance and rotational position.

Clause 17. The wind turbine of any preceding clause, wherein the plurality of operations further comprise: determining a type of blade liberation event based on the at least two actual response signatures, wherein the type of blade liberation event comprises a departure of at least a portion of one of the plurality of rotor blades.

Clause 18. The wind turbine of any preceding clause, wherein the rapid shutdown control logic comprises decelerating the rotor in a shortened time interval relative to a nominal shutdown control logic.

Clause 19. The wind turbine of any preceding clause, wherein decelerating the rotor and a shortened time interval comprises: generating, with the controller, a pitch setpoint command for the plurality of rotor blades, wherein the pitch setpoint command directs a pitch control mechanism to pitch the plurality of rotor blades to feather at a pitch rate exceeding a nominal pitch rate threshold; and generating, with the controller, a generator setpoint for a generator of the wind turbine, wherein the generator setpoint directs a converter controller to develop a generator torque exceeding a nominal generator torque threshold; and overriding an operational limit of at least one component of the wind turbine, wherein the operational limit is above a nominal operational limit such that excessive loading or damage of the at least one component is permitted.

Clause 20. The wind turbine of any preceding clause, wherein the high-speed shaft further comprises a slip coupling, the plurality of operations further comprising: monitoring a torque level of the slip coupling; and reducing the generator setpoint when the torque level of the slip coupling approaches a release threshold of the slip coupling.

What is claimed is:

1. A method for controlling a wind turbine in response to a blade liberation event, the wind turbine having a rotor with a rotatable hub and a plurality of rotor blades mounted thereto, the method comprising:

determining a plurality of estimated response signatures for the wind turbine corresponding to a plurality of different blade liberation events;

collecting sensor data via a plurality sensors during operation of the wind turbine, the sensor data being indicative of a response of at least one component of the wind turbine to an actual rotor loading;

identifying at least two actual response signatures within the sensor data;

determining whether the at least two actual response signatures equal or exceed two or more corresponding estimated response signatures of the plurality of estimated response signatures so as to determine the presence of a blade liberation event; and in response to detecting the blade liberation event, initiating, with a controller, a rapid shutdown control logic to protect the wind turbine, wherein the rapid shutdown control logic comprises overriding a nominal operational limit of the at least one component of the wind turbine and establishing a rapid shutdown setpoint for the at least one component of the wind turbine, wherein the rapid shutdown setpoint has a value greater than the nominal operational limit such that excessive loading or damage of the at least one component is permitted.

2. The method of claim 1, wherein the plurality of estimated response signatures comprise at least one of a load magnitude, a direction of the load being along a pitch axis, an acceleration vector of the at least one component, a first excitation frequency, a sensor communication loss, an acoustic signature corresponding to blade liberation, a vibration signature corresponding to blade liberation, a bending moment affecting a rotor shaft or a tower of the wind turbine, or a combination thereof.

3. The method of claim 2, wherein the acceleration vector of the at least one component comprises:
a horizontal and a vertical displacement of the rotor in response to the actual loading on the rotor.

4. The method of claim 2, wherein the acceleration vector of the at least one component comprises:
an acceleration of a nacelle of the wind turbine in response to a wind loading, wherein the nacelle acceleration comprises an oscillation direction, an oscillation frequency, and an oscillation magnitude of the nacelle.

5. The method of claim 2, wherein the acceleration vector of the at least one component comprises:
a rotor speed response, wherein the rotor speed response is indicative of an acceleration or deceleration of the rotor in response to a rotor mass balance and rotational position.

6. The method of claim 1, further comprising:
determining a type of blade liberation event based on the at least two actual response signatures, wherein the type of the blade liberation event comprises a departure of at least a portion of one of the plurality of rotor blades.

7. The method of claim 1, wherein the rapid shutdown control logic comprises decelerating the rotor in a shortened time interval relative to a nominal shutdown control logic.

8. A wind turbine, comprising:
a tower;
a nacelle mounted atop the tower;
a rotor mounted to the nacelle, the rotor comprising a rotatable hub having a plurality rotor blades secured thereto via a pitch drive mechanism;
a generator disposed within the nacelle and operably coupled to the rotor via a gearbox and a high-speed shaft; and,
a controller communicatively coupled to a plurality of sensors, the generator, and the pitch drive mechanism, the controller comprising at least one processor configured to perform a plurality of operations, the plurality of operations comprising:
collecting sensor data via the plurality sensors during operation of the wind turbine, the sensor data being indicative of a response of a component of the wind turbine to a rotor loading,
identifying at least two actual response signatures within the sensor data,
determining whether the at least two actual response signatures equal or exceed two or more corresponding estimated response signatures of a plurality of estimated response signatures so as to determine the presence of a blade liberation event, wherein the plurality of estimated response signatures correspond to a plurality of different blade liberation events, and
in response to detecting the blade liberation event, initiating a rapid shutdown control logic to protect the wind turbine, wherein the rapid shutdown control logic comprises overriding a nominal operational limit of the component of the wind turbine and establishing a rapid shutdown setpoint for the component of the wind turbine, wherein the rapid shutdown setpoint has a value greater than the nominal operational limit such that excessive loading or damage of the component is permitted.

9. The wind turbine of claim 8, wherein the plurality of estimated response signatures comprise at least one of a load magnitude, a direction of the load being along a pitch axis, an acceleration vector of the component, a first excitation frequency, a sensor communication loss, an acoustic signature corresponding to blade liberation, a vibration signature corresponding to blade liberation, a bending moment affecting a rotor shaft or the tower of the wind turbine, or a combination thereof.

10. The wind turbine of claim 9, the plurality of estimated response signatures comprises a plurality of acceleration vectors, the plurality of acceleration vectors comprising:
an acceleration of the nacelle in response to a wind loading, wherein the nacelle acceleration comprises an oscillation direction, an oscillation frequency, and oscillation magnitude of the nacelle;
a horizontal and a vertical displacement of the rotor in response to the load on the rotor; and
a rotor speed response, wherein the rotor speed response is indicative of an acceleration or deceleration of the rotor in response to a rotor mass balance and rotational position.

11. The wind turbine of claim 8, wherein the plurality of operations further comprise:
determining a type of blade liberation event based on the at least two actual response signatures, wherein the type of blade liberation event comprises a departure of at least a portion of one of the plurality of rotor blades.

12. The wind turbine of claim 8, wherein the rapid shutdown control logic comprises decelerating the rotor in a shortened time interval relative to a nominal shutdown control logic.

13. The wind turbine of claim 12, wherein decelerating the rotor and the shortened time interval comprises:
generating, with the controller, a pitch setpoint command for the plurality of rotor blades, wherein the pitch setpoint command directs a pitch control mechanism to pitch the plurality of rotor blades to feather at a pitch rate exceeding a nominal pitch rate threshold; and
generating, with the controller, a generator setpoint for the generator of the wind turbine, wherein the generator setpoint directs a converter controller to develop a generator torque exceeding a nominal generator torque threshold.

14. The wind turbine of claim 13, wherein the high-speed shaft further comprises a slip coupling, the plurality of operations further comprising:
monitoring a torque level of the slip coupling; and,
reducing the generator setpoint when the torque level of the slip coupling approaches a release threshold of the slip coupling.

* * * * *